INVENTOR
MATHEW A. SLAATS
BY Toulmin & Toulmin
ATTORNEYS

June 18, 1968 M. A. SLAATS 3,389,211

ELECTRONIC KEYER

Filed Jan. 5, 1965 2 Sheets-Sheet 2

INVENTOR.
MATHEW A. SLAATS
BY
Toulmin & Toulmin
ATTORNEYS

United States Patent Office 3,389,211

Patented June 18, 1968

3,389,211

ELECTRONIC KEYER

Mathew A. Siaats, Jasper, Ind., assignor to Jasper Electronic Mfg. Corp., Jasper, Ind., a corporation of Indiana Filed Jan. 5, 1965, Ser. No. 423,489
6 Claims. (Cl. 84—1.01)

ABSTRACT OF THE DISCLOSURE

An electronic keying or switching arrangement in which a generator providing at least two electrical signals of different frequencies is connected to a signal receiver via first and normally nonconducting electronic switches with at least an additional one-way normally nonconductive electronic switch interconnecting the output sides of the first electronic switches together with a source of control voltage for making the switches conductive and control switches or keys for selectively connecting the control voltage with the respective electronic switches. The receiver may consist of an amplifier and a speaker and voicing circuits may be included in series with the amplifier and speaker.

This invention relates generally to a switching arrangement and is particularly concerned with an electronic switching arrangement for controlling the connection of a signal source to a signal receiver without the use of contacts in the connecting circuit.

More particularly still, the present invention relates to an electronic keying arrangement especially adapted for use with electrical musical instruments, and especially with electric and electronic organs.

In electric or electronic organs, multiple circuits must be controlled by the playing keys, and heretofore this has been done by elaborate circuitry involving multiple playing key controlled contacts. An arrangement of this nature, while basically electrically and mechanically operative, has defects in that the wiring is complex and expensive, and in that multiple contacts must be maintained in good condition to maintain operating efficiency. Still further, with a musical instrument such as an organ, there is apt to be a noise developed at the instant of opening and closing a key controlled contact which is, of course, undesirable. Still further, when a key controls multiple contacts it is possible for the contacts to be closed sequentially by the key so that at times care must be taken in closing the key to close all of the pertaining circuits at the same time, such care taking the form of depressing the key quickly and fully without any hesitation.

The present invention proposes to eliminate the drawbacks referred to above by the use of a novel switching circuit interconnecting the signal source with the signal receiver and which circuit is controlled electronically by a playing key with a single contact carried by the key.

The primary object of the present invention therefore is to provide a greatly simplified and improved keying arrangement for musical instruments such as electronic organs and the like.

A still further object of this invention is the provision of a keying arrangement for an electronic organ in which the maximum flexibility is maintained, and in which each key operates only a single contact.

Still another object of this invention is the provision of an electronic keying arrangement for an electric or electronic organ in which the keying circuit is readily adjustable to vary the character of the transmitted signal particularly with respect to the rate of attack and rate of decay thereof.

A particular object of the present invention is the provision of an electronic keying arrangement for electric or electronic organs in which all circuit noise occasioned by opening and closing the playing keys is eliminated.

These and other objects and advantages of this invention will become more apparent upon reference to the following specification taken in connection with the accompanying drawings, in which.

Figures 1, 5:
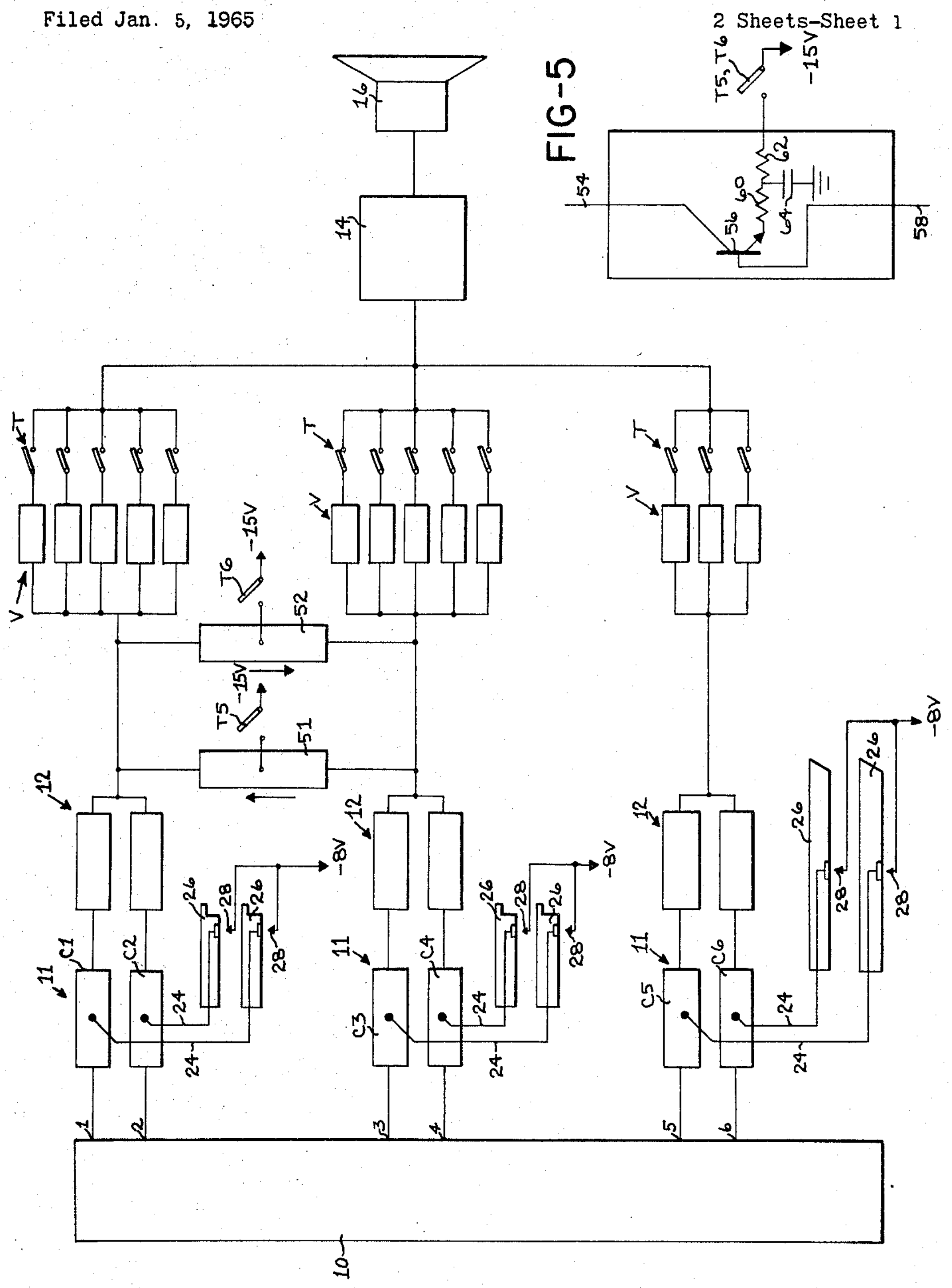
FIGURE 1 is a schematic representation of a portion of an organ circuit in broken diagram form showing the application of the keying arrangement of the present invention to the notes pertaining to one of the tone generators of an organ.
FIGURE 5 is a schematic representation of a coupling amplifier.

Referring to FIGURE 1, rectangle 10 indicates a tone generator which may be of any type and which develops signals of respectively different frequencies at output terminals marked 1, 2, 3, 4, 5 and 6 with the frequency of output terminal 1 being the highest, and this frequency reducing in octaves from one output terminal to the next down to the lowest frequency at output terminal 6.

The outputs of tone generator 10 are delivered to the input sides of keyers 11, then to preamplifiers 12, then through voice cards V and tab switches T to a final amplifying means 14, and from which the amplifier signals are delivered to speaker means 16.

The voicing stages referred to may be as numerous as desired and, as well known, modify the signal passing from the preamplifiers 12 to amplifier means 14 in order to produce desired musical effects. For example, the voices may consist of flute, cello, diapason and violin effects, as are well known in the organ art. The voicing stages are adapted for being made singly or jointly effective by the adjustment of the tab switches serially arranged with the respective voicing cards.

The particular part of the circuit with which the present invention is concerned is located between tone generator 10 and the preamplifiers 12, and consists of a plurality of cards C1 and C2 pertaining to the upper keyboard, C3 and C4 pertaining to the lower keyboard and C5 and C6 pertaining to the pedal keyboard. These cards are keyers which contain controllable electronic circuit elements operable for connecting the various output terminals of tone generator 10 with the input side of preamplifiers 12.

Each keyboard, of course, comprises many playing keys and there is a keyer card and a preamplifier 12 pertaining to each playing key. For the sake of simplicity, only two keys of each keyboard are shown.

Each keyer is an electronic circuit which is normally nonconductive so signals will not pass therethrough, but includes a gate or control element which, when connected to a certain voltage supply, will make the circuit conductive.

Control of the conductivity of each keyer circuit is effected by control line 24 leading therefrom to the pertaining playing key 26 which, when depressed, will connect line 24 with terminal 28 and, when released, will disconnect line 24 from terminal 28. When terminal 28 is conected to line 24 by depressing a playing key, the keyer circuit pertaining to the playing key is conductive, and when terminal 28 is disconnected from line 24 by release of the playing key, the circuit becomes nonconductive. Terminal 28 is connected to a source of current, either positive or negative, as the situation may require, and which current is that required to make keyer circuits conductive when connected thereto as will be explained more in detail hereinafter.

All of the keyer cards have like circuits thereon under the control of a respective key 26 and this circuit is operable for selectively connecting the respective output terminal of tone generator 10 with the input of the respective amplifier 12.

Figure 2:
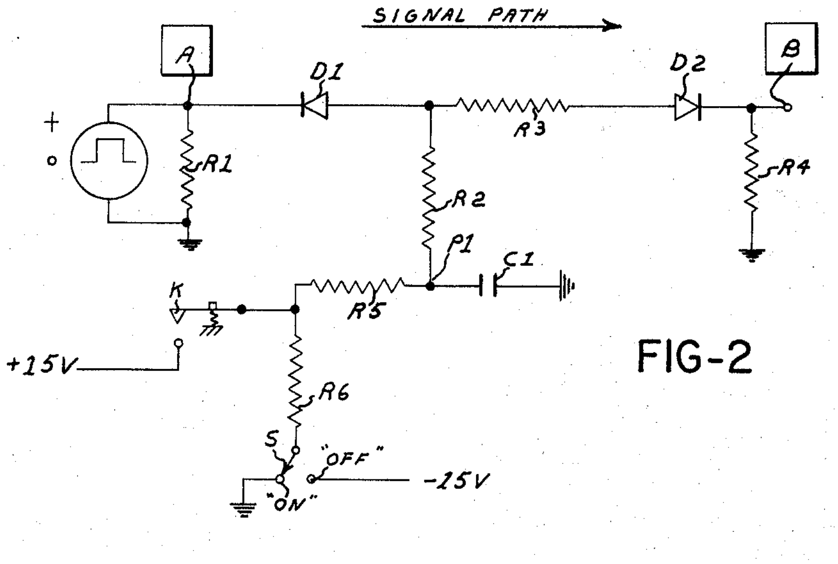
FIGURE 2 is a schematic diagram of one form which the keying circuit according to the present invention can take.

With regard to the circuits on the keyer cards 11 that are controlled by the playing keys, a typical circuit of this nature is illustrated in FIGURE 2. In FIGURE 2, the output from one of the output terminals of the tone generator is indicated at point A. The connection to the input side of the respective preamplifier 12 is indicated by point B.

The key switch which is operated during playing of the instrument is indicated at K and is normally open.

Extending from point A to point B is a line containing low leakage silicon type diodes D1 and D2 in back to back relation with a resistor R3 interposed therebetween. From a point on the line between diode D1 and resistor R3 is a resistor branch R2 leading to a point P1 which is connected to ground through a condenser C1 which is a nonpolarized electrolytic condenser, while on the other hand, point P1 is connected through another resistor R5 to key switch K which, upon being depressed, engages a contact maintained at a positive voltage, say +8 or +15 volts.

Resistor R5 at the end thereof connected to key switch K is also connected to one end of a resistor R6, the other end of which is connected with a sustain switch S which has one position where it closes on a ground connection which is indicated as an "ON" position, and which has a second or "OFF" position wherein the switch blade is connected to a negative voltage, say −15 volts.

The circuit operates in the following manner:

When key switch K is depressed, diodes D1 and D2 become conductive and the signal from point A will be transmitted undistorted to point B.

If switch S is in its "ON" position, when switch K is released, the voltage applied to condenser C1 bleeds off to ground through resistors R5 and R6 thus causing a gradual drop in cnductivity in the signal path which causes a sustaining action.

If switch S, on the other hand, is in the "OFF" position −15 volts is applied to the one end of resistor R6 which, through resistors R5 and R2, will instantaneously drive diodes D1 and D2 to cut off as soon as the key switch is open. The condenser C1 at this time has substantially no effect.

It will be evident that when the key switch is open and switch S is in its "OFF" postion, diodes D1 and D2 are subjected to a negative bias which absolutely blocks the signal path.

Figure 3:
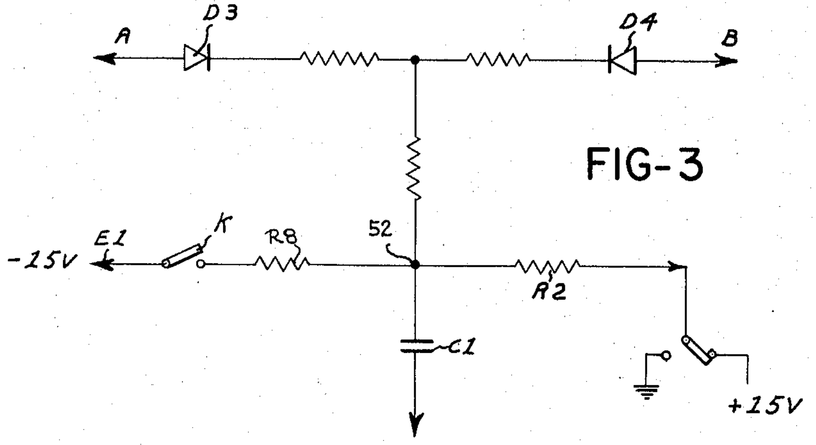
FIGURE 3 is a diagram similar to FIGURE 2 but showing the diode elements therein in reversed relation.

In FIGURE 3 a quite similar arrangement is illustrated except that the diodes D3 and D4 are reversed from what is shown in FIGURE 2. The circuitry in other respects is quite similar and is not described in any detail except to point out that since the diodes are reversed, the polarities at the key switch and at the sustain switch are reversed.

Figure 4:
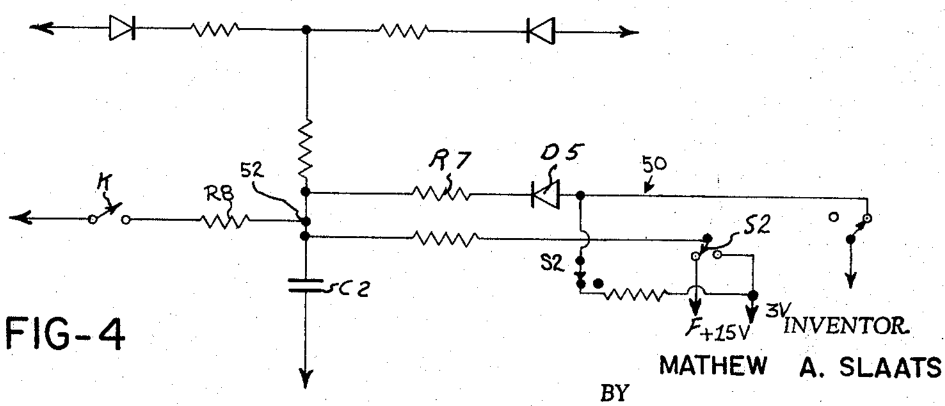
FIGURE 4 shows a modification of the circuit.

FIGURE 4 shows a modification in which the control of the sustain action is obtained through a branch circuit 50 in which on-off sustain switch S1, and short and full sustain switch S2 is located, and which circuit also includes a diode D5 and a resistor R7. In both the circuits of FIGURES 4 and 3 the point at which the key switch is connected is indicated at 52, and between this point and the key switch is located a resistor R8. Each key switch can be connected to as many of the electronic circuits as desired, there being no limit theoretically to the number of circuits that can be controlled by a single contact in this manner.

The result of using an electronic keying arrangement of the nature described is that relatively simple circuitry is obtained in an organ while full flexibility with regard to coupling and the like and voicing is maintained, while all noises due to opening and closing of the switches is eliminated and the difficulty of installing and maintaining multiple contacts at each key and effecting synchronization of the opening and closing thereof is eliminated. A particular benefit of electronic keying of this nature in an electronic organ is to be found in connection with the pedal board which, due to the extreme simplicity of the contacts controlled by the pedals, can be formed as a unit separate from the organ and connected thereto by a small cable. The pedal board, of course, is located in the proper position but does not require mechanical connections to hold it in place and does not require any switches to be mounted in regions difficult of access inside the organ to be controlled by the pedals.

With respect ot the aforementioned coupling and the like, the respective tab switches have been illustrated in circuit with the voicing cards or stages V, but it will be understood that to effect coupling of various keys in the organ as, for example, coupling of the upper manual to the lower manual, and vice versa, coupling amplifiers such as those identified at 51 and 52 are employed located between the preamplifiers 12 and the voice cards. Switches T5 and T6 control the coupling amplifiers 51 and 52, an example of which is shown in FIGURE 5.

In FIGURE 5, terminal 54 is the input terminal and leads to the collector of a transistor 56. Terminal 58 is the output terminal and leads from the base of the transistor. The emitter of the transistor is connected through resistor 60 and 62 to a tab switch T5, T6 with condenser 64 connected between the junction of the resistor and ground. Each coupling amplifier is normally nonconductive and, when made conductive by closing of the respective switch, will pass signals in only one direction.

While the circuit illustrated, as has been mentioned, is greatly simplified over the circuitry of an entire electric or electronic organ, it will be understood that the electronic switches to be controlled by single contacts could be located substantially any place within the organ circuitry for controlling the conductivity of individual circuits within the organ, such as the keyer circuits and the coupling amplifiers shown.

It will be understood that this invention is susceptible to modification in order to adapt it to different usages and conditions; and accordingly, it is desired to comprehend such modifications within this invention as may fall within the scope of the appended claims.

I claim:

1. In combination; an electric signal generator having at least two output terminals of respectively different frequencies, a signal receiver, first electronic switches connecting said output with said receiver, at least one further one way electronic switch interconnecting the output sides of said first electronic switches, each said switch having a control element sensitive to a control voltage for opening and closing the respective switch, and means selectively operable for connecting the respective said elements to a source of control voltage, said receiver means comprising amplifier means and speaker means.

2. In combination; an electric signal generator having at least two output terminals of respectively different frequencies, a signal receiver, first electronic switches connecting said outputs with said receiver, at least one further one way electronic switch interconnecting the output sides of said first electronic switches, each said switch having a control element sensitive to a control voltage for opening and closing the respective switch, means selectively operable for connecting the respective said elements to a source of control voltage, said receiver means comprising amplifier means and speaker means, and a plurality of voicing circuit means connected in parallel with each other and in series with said amplifier means and speaker means and including control switches for making the said voicing circuit means selectively operable.

3. In combination; in an electric organ circuit, an electric tone generator having a plurality of output terminals, said output terminals providing signals of respectively different frequencies, a signal receiver comprising amplifier means and speaker means and voicing circuit means, a first electronic switch having its input side connected to each terminal of the tone generator, a preamplifier connected to the output side of each said first switch, means connecting the output sides of groups of said preamplifiers together, a plurality of voicing circuits connected in said parallel for each group of preamplifiers, means connecting the output sides of each said group of preamplifiers to the input sides of the pertaining said voicing circuits, means connecting the output sides of said voicing circuits to said receiver, second one-way electronic switches interconnecting the output sides of at least some of said groups of preamplifiers, each said electronic switch having a control element responsive to a control voltage for making the pertaining electronic switch conductive, a source of control voltage, playing keys connected between said source of control voltage and the control elements of said first electronic switches, and tab switches connected between said source of control voltage and the control elements of said second electronic switches.

4. In combination; in an electric organ circuit, an electric tone generator having a plurality of output terminals, said output terminals providing signals of respectvely different frequencies, a signal receiver comprising amplifier means and speaker means and voicing circuit means, a first electronic switch having its input side connected to each terminal of the tone generator, a preamplifier connected to the output side of each said first switch, means connecting the optput sides of groups of said preamplifiers together, a plurality of voicing circuits connected in said parallel for each group of preamplifiers, means connecting the output sides of each said group of preamplifiers to the input sides of the pertaining said voicing circuits, means connecting the output sides of said voicing circuits to said receiver, second one-way electronic switches interconnecting the output sides of at least some of said groups of preamplifiers, each said electronic switch having a control element responsive to a control voltage for making the pertaining electronic switch conductive, a source of control voltage, playing keys connected between said source of control voltage and the control elements of said first electronic switches, tab switches connected between said source of control voltage and the control elements of said second electronic switches, and other tab switches in said individual voicing circuit means for making the individual voicing circuits selectively effective.

5. In combination; an electric signal generator having at least two output terminals of respectively different frequencies, a signal receiver, first electronic switch means connecting each of said output terminals with the input of said receiver, second one-way electronic switch means connecting the output side of at least one of said first electronic switch means with the output side of another thereof, each said electronic switch means having a control element sensitive to a control voltage for opening and closing the respective switch means, a source of control voltage for said electronic switch means, and means selectively operable for connecting the respective said elements to said source of control voltage and comprising a normally open key connected between the element pertaining to each of the said first electronic switch means and said source of control voltage and switch elements selectively adjustable between open and closed positions and connected between said source of control voltage and the control elements of said second electronic switch means.

6. The combination according to claim 5 where includes delay means connected to the control elements of said first electronic switches and operable upon opening of a said key for causing the voltage on the respective control element to decay over a period of time, and a control switch connected to said delay means adjustable for making the said delay means selectively effective and ineffective.

References Cited

UNITED STATES PATENTS

| | | | |
|---|---|---|---|
| 2,486,208 | 10/1949 | Rienstra | 84—1.26 |
| 2,618,753 | 11/1952 | Van Mierlo | 307—88.5 X |
| 2,657,318 | 10/1953 | Rack | 307—88.5 X |
| 2,811,069 | 10/1957 | Faulkner | 84—1.26 X |
| 3,139,587 | 6/1964 | Peck | 307—88.5 X |
| 3,150,228 | 9/1964 | Gibbs et al. | 84—1.26 |
| 3,176,060 | 3/1965 | Bissonette et al. | 84—1.26 X |
| 3,207,952 | 9/1965 | Brahm | 84—1.26 X |

ARTHUR GAUSS, *Primary Examiner.*

DONALD D. FORRER, *Examiner.*